C. B. DALZELL.
CENTRIFUGAL LIQUID SEPARATOR.
APPLICATION FILED MAR. 27, 1917.

1,265,061.

Patented May 7, 1918.
2 SHEETS—SHEET 1.

Inventor.
Charles B. Dalzell.
by Wilhelm & Parker.
Attorneys.

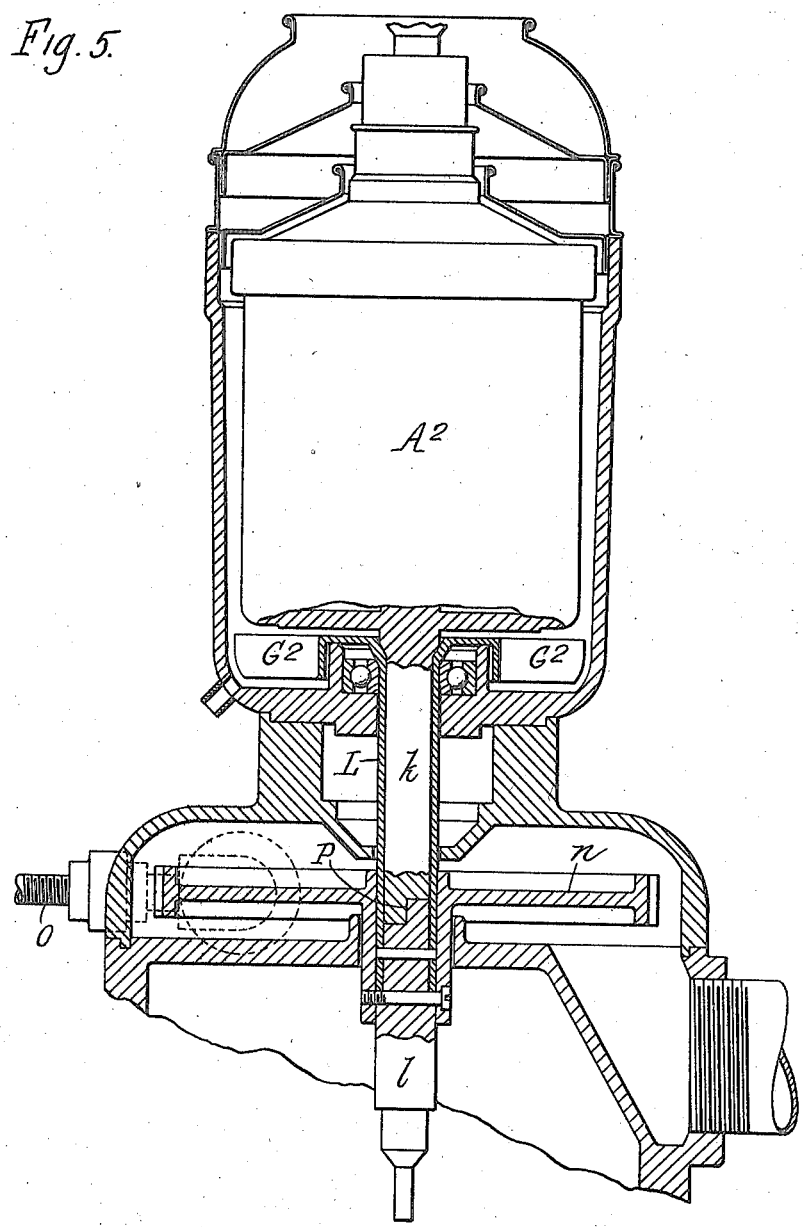

UNITED STATES PATENT OFFICE.

CHARLES B. DALZELL, OF LITTLE FALLS, NEW YORK, ASSIGNOR TO D. H. BURRELL & COMPANY, OF LITTLE FALLS, NEW YORK.

CENTRIFUGAL LIQUID-SEPARATOR.

1,265,061.  Specification of Letters Patent.  Patented May 7, 1918.

Application filed March 27, 1917. Serial No. 157,616.

*To all whom it may concern:*

Be it known that I, CHARLES B. DALZELL, a citizen of the United States, residing at Little Falls, in the county of Herkimer and State of New York, have invented a new and useful Improvement in Centrifugal Liquid-Separators, of which the following is a specification.

This invention relates to centrifugal liquid separators of the kind comprising a revolving bowl into which the liquid to be separated is fed, and which has outlets near its upper portion through which the separated lighter and heavier parts of the liquid discharge into annular receptacles at the upper part of the case within which the bowl revolves.

In many separators of this kind as heretofore constructed, the revolving bowl is so proportioned and related to the surrounding parts that the revolving separator bowl produces a fan action which causes a downward flow of air in the space between the bowl and the bowl case. This flow of air causes an objectionable intermingling of the separated liquids and draws foam or small particles of the separated liquids downwardly into the bowl case, where the accumulation of such liquid interferes with the proper operation of the apparatus.

The objects of this invention are to provide means which revolve with the separator bowl of centrifugal liquid separators for influencing the air current in the bowl case surrounding the bowl so as to oppose a downward flow thereof, and preferably so that it shall be upward through the openings in the receptacles that receive the separated liquids from the bowl, thus preventing any foam or liquid from being carried downwardly from the upper into the lower receptacle and from being carried downwardly into the bowl case; also to improve centrifugal liquid separators of this kind in other respects hereinafter specified.

In the accompanying drawings:—

Fig. 5 is a view similar to Fig. 1 showing still another construction embodying the invention.

Figure 1:
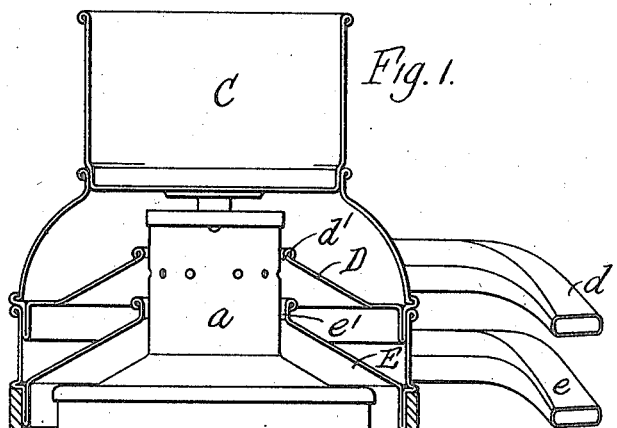
Figure 1 is a fragmentary sectional elevation of a centrifugal liquid separator showing a separator bowl provided with means embodying the invention for preventing the downward flow of air in the bowl case.
Figure 2:
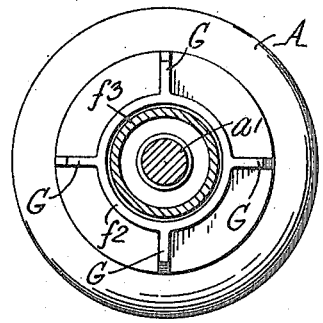
Fig. 2 is a sectional bottom plan view of the separator on line 2—2, Fig. 1.

Referring first to the construction shown in Figs. 1 and 2:—

The centrifugal separator includes a revolving separator bowl A having a reduced upper portion $a$ containing the discharge openings for the separated parts of the liquid, and is arranged within a bowl case or housing B. The bowl is mounted on the usual spindle $a'$ by which it is revolved. The liquid to be separated is fed to the revolving bowl from a feed cup or container C, the lighter part of the liquid being discharged from the bowl into a receptacle D having a discharge spout $d$, and the heavier part of the liquid being discharged into a receptacle E having a discharge spout $e$. The receptacle D, as usual, is mounted on the receptacle E, which is supported on the bowl case B, both receptacles being annular in shape and having portions $d'$ and $e'$ extending into proximity to the reduced upper portion $a$ of the separator bowl. The bowl case or housing B shown in the drawings is mounted on a supporting frame $f$ and is provided with the usual downward extension $f'$ which contains a neck bearing F of any suitable construction for the bowl spindle. In order to prevent liquids, which may enter the bowl case, from passing into the neck bearing, the separator bowl shown in Figs. 1 and 2, is provided with a downwardly extending flange $f^2$ which surrounds an upwardly extending flange or sleeve $f^3$ on the bottom of the bowl case. All of these parts may be of any usual or suitable construction and of themselves constitute no part of this invention.

If the current of air produced by the revolving separator bowl flows downwardly through the openings of the vessels D E, and in the space between the separator bowl and the bowl case, it will draw foam or particles of the separated liquids downwardly, thus carrying particles of the lighter liquid downwardly into the heavier liquid and thereby interfering with the proper separation of the liquids, and also carrying the foam or liquid down into the bowl case B from which it may find its way into the neck bearing, thus shortening considerably the life of the bearing. The accumulation of liquid in the bowl case also is unsanitary. For the purpose of counteracting this downward flow of air and preferably producing an upward flow of air in the bowl case and through the openings of the vessels D E, vanes, blades or parts are provided at the lower portion of the bowl arranged to revolve with the bowl and induce an upward pressure or flow of air in the bowl case. In the construction shown in Figs. 1 and 2, blades or vanes G are formed on the bottom of the separator bowl, those shown being formed integral with the base of the bowl and extending radially outwardly from the flange $f^2$. The blades force air toward the outer portions of the bowl case B by their fan action, drawing the air upwardly through or around the neck bearing F, the lower extension $f'$ of the bowl case being preferably provided with holes or openings $g$ for the entrance of the air. The size and shape of the blades are such as to make the fan action of the bottom of the bowl greater than that of the top of the bowl, thereby creating an upward pressure or current of air in the bowl case which counteracts the tendency of the air to flow downwardly, and preferably causes a current to flow upwardly in the bowl case and through the openings in the vessels D E.

It is customary to provide a drain hole H in the bottom of the bowl case to draw off any liquid from the case. The liquid may be liquid which leaks out at the joint between the bowl and its cover if the joint is defective, liquid due to the collection of foam in the bowl case, or water used for washing the machine. Disregarding the air current in the bowl case, the location of the drain hole is unimportant so long as it is at some low point suitable to insure the proper drainage of the bowl case. In connection with this invention, however, it is desirable to locate the drain hole as near as possible to the center of the bowl case so as to reduce to the minimum the loss in air pressure. The nearer the center this drain hole is located, the smaller the blades G need be in order to produce the required upward air pressure. In the construction shown in Figs. 1 and 2, the drain hole H is arranged as near to the center of rotation of the blades as is practical, and a drain trough or pipe $h$ is provided to receive the liquid discharged from the hole H and conduct it beyond the frame of the apparatus.

The construction described enables the desired result to be obtained in a very efficient way, since a liberal volume of air can be sucked in at the center of the bowl case and the loss of air pressure is just as little as is practicable due to the nearly central location of the drain hole H.

Figure 3:
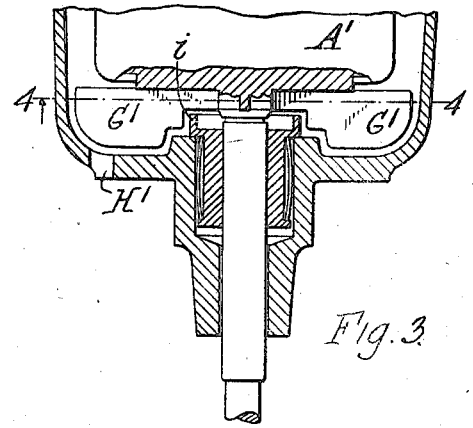
Fig. 3 is a sectional elevation of a separator case, showing a bowl provided with means of modified construction for preventing the downward flow of air.
Figure 4:
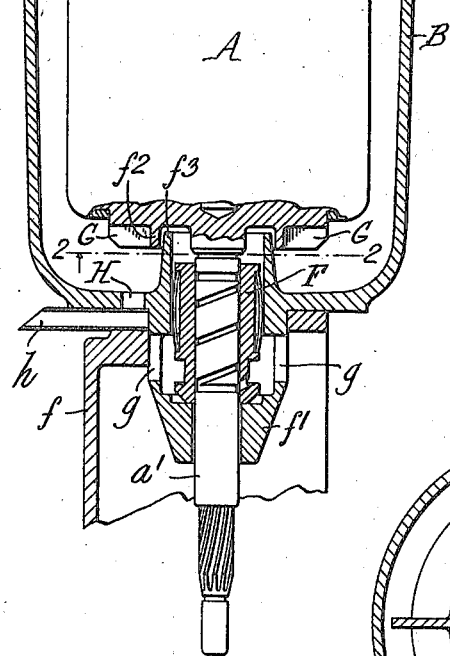
Fig. 4 is a sectional bottom plan view thereof on line 4—4, Fig. 3.
Figure 4:
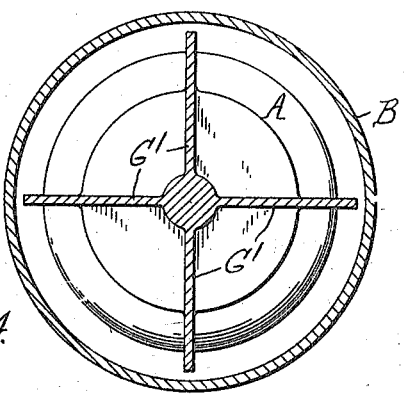

In the construction shown in Figs. 3 and 4, blades $G'$ of larger size are secured to the base of the separator bowl $A'$ and extend into proximity to the bowl case. In this case a drain hole $H'$ may be arranged at a greater distance from the axis of rotation of the bowl than in the construction shown in Figs. 1 and 2. In this construction no special provisions are made for permitting air to pass up through the space around the neck bearing, the clearance between the bowl spindle and the extension of the bowl casing, however, allowing the entrance of air.

The sleeve $f^3$ and flange $f^2$ shown in Figs. 1 and 2 are not essential to the attainment of the object of this invention, and, as shown in Figs. 3 and 4, the flange $i$ is made lower and the flange $f^2$ omitted and the blades $G'$ extend inwardly to the bowl spindle.

In the constructions before described the fan blades are shown as attached to or forming part of the bowl. Manifestly, vanes or blades could be arranged at or near the lower part of the bowl so as to revolve with the bowl and produce the desired action without being a part of or attached directly to the bowl. For instance, in the construction shown in Fig. 5, the spindle $k$ which is secured to the bowl $A^2$ is removably seated in and revolves with a hollow spindle or shaft L which is driven by suitable mechanism for revolving the bowl and vanes or blades $G^2$ are formed on or attached to the upper end of this hollow spindle beneath the bottom of the bowl. These blades revolve with the spindle and bowl and produce an effect similar to the blades in the other constructions. In this construction the hollow spindle is shown as being revolved by a steam turbine wheel $n$ which is attached to the spindle and driven by steam discharged from a nozzle attached to the pipe O, the spindles $k$ and L having interlocking parts P which cause the former to revolve with the latter while permitting the spindle $k$ on the bowl to be withdrawn from the hollow spindle for removing the bowl.

I claim as my invention:—

1. In a centrifugal liquid separator, the combination of a revolving separator bowl, a stationary bowl case in which said bowl revolves, the space surrounding the bowl being free from obstructions that prevent air from rotating with the bowl in said space, and means which revolve with said bowl and are arranged to cause an air pressure in the bowl case which opposes any downward flow of air in the bowl case due to the revolution of the bowl.

2. In a centrifugal liquid separator, the combination of a revolving separator bowl, a stationary bowl case in which said bowl revolves, the space surrounding the bowl being free from obstructions that prevent air from rotating with the bowl in said space, and means revolving with said bowl and arranged to cause a flow of air upwardly through the space between the bowl and bowl case.

3. In a centrifugal liquid separator, the combination of a revolving separator bowl, a bowl case in which said bowl revolves, means for admitting air into the lower portion of said bowl case, and blades at the lower portion of said bowl which revolve with the bowl for causing an upward current of air through the space between the bowl and bowl case.

4. In a centrifugal liquid separator, the combination of a revolving separator bowl, a bowl case in which said bowl revolves, and blades on the lower portion of said bowl for causing an upward current of air through the bowl case.

5. In a centrifugal liquid separator, the combination of a revolving separator bowl, a bowl case in which said bowl revolves, an air inlet in the lower portion of said bowl case, and blades which revolve with said bowl for causing air to flow upwardly in said bowl case from said air inlet.

6. In a centrifugal liquid separator, the combination of a revolving separator bowl, a bowl case in which said bowl revolves and which has a drain hole in its bottom, and blades on the lower portion of said bowl to cause air to flow upwardly in said bowl case, said blades extending to a greater distance from the axis of rotation of said bowl than said drain hole.

7. In a centrifugal liquid separator, the combination of a revolving separator bowl, a bowl case in which said bowl revolves, and blades formed integral with the base portion of said bowl for causing air to flow upwardly in said bowl case.

8. In a centrifugal liquid separator, the combination of a revolving separator bowl, a stationary bowl case in which said bowl revolves, and receiving vessels for the separated liquids surrounding the upper portion of said bowl, the space between the upper portion of the bowl and the adjacent receiving vessel being free from obstructions that prevent the air from revolving with the bowl in said space, said bowl being so constructed and related to said other parts that the lower portion of the bowl has a greater fan effect than the upper portion of the bowl and produces an upward flow of air through the openings of said vessels.

9. In a centrifugal liquid separator, the combination of a revolving separator bowl, a bowl case in which said bowl revolves, and receiving vessels for the separated liquids surrounding the upper portion of said bowl, fan blades which are located at the lower portion of the bowl and revolve with the bowl and produce an upward flow of air through the openings of said vessels.

Witness my hand, this 21st day of March, 1917.

CHARLES B. DALZELL.

Witnesses:
  SAMUEL HOUPT,
  ARTHUR W. LAIRD.